(12) United States Patent
De Carteret et al.

(10) Patent No.: US 10,967,698 B2
(45) Date of Patent: Apr. 6, 2021

(54) SELF-BALANCING MULTI-CHAMBER AIR SPRING

(71) Applicant: GM GLOBAL TECHNOLOGY OPERATIONS LLC, Detroit, MI (US)

(72) Inventors: David T. De Carteret, Fenton, MI (US); Brian K. Saylor, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 16/214,482

(22) Filed: Dec. 10, 2018

(65) Prior Publication Data

US 2020/0180383 A1 Jun. 11, 2020

(51) Int. Cl.
| | | |
|---|---|---|
| *B60G 17/08* | (2006.01) | |
| *B60G 17/052* | (2006.01) | |
| *B60G 11/27* | (2006.01) | |
| *F16F 9/02* | (2006.01) | |
| *F16F 9/46* | (2006.01) | |

(52) U.S. Cl.
CPC ............ *B60G 17/052* (2013.01); *B60G 11/27* (2013.01); *B60G 17/0525* (2013.01); *F16F 9/0245* (2013.01); *F16F 9/46* (2013.01); *B60G 2202/152* (2013.01); *B60G 2206/42* (2013.01); *B60G 2500/20* (2013.01); *B60G 2500/30* (2013.01); *B60G 2800/162* (2013.01); *F16F 2222/126* (2013.01); *F16F 2228/066* (2013.01)

(58) Field of Classification Search
CPC .... B60G 13/10; B60G 13/14; B60G 17/0152; B60G 17/016; B60G 17/033; B60G 17/08

USPC .......... 188/266.2, 266.5, 316–319.1, 322.21; 280/5.5, 5.508, 124.156, 124.157; 267/64.23, 64.26

See application file for complete search history.

(56) References Cited

U.S. PATENT DOCUMENTS

| | | | | | |
|---|---|---|---|---|---|
| 4,936,423 | A | * | 6/1990 | Karnopp | B60G 17/0152 137/625.47 |
| 5,401,053 | A | * | 3/1995 | Sahm | B60G 17/016 188/266.5 |
| 7,390,001 | B2 | * | 6/2008 | Mizuno | B60G 17/033 280/124.104 |
| 7,413,062 | B2 | * | 8/2008 | Vandewal | B60G 17/0152 188/266.5 |
| 8,123,235 | B2 | * | 2/2012 | Monk | B60G 21/06 280/5.5 |
| 8,544,863 | B2 | * | 10/2013 | Revill | B60G 21/06 280/124.16 |
| 9,981,523 | B2 | * | 5/2018 | Kamil | B60G 17/08 |
| 2006/0237942 | A1 | * | 10/2006 | Munday | B60G 21/073 280/124.157 |
| 2008/0164111 | A1 | * | 7/2008 | Inoue | B60G 17/021 188/297 |

(Continued)

*Primary Examiner* — Christopher P Schwartz
(74) *Attorney, Agent, or Firm* — Quinn IP Law

(57) ABSTRACT

An exemplary self-balancing air spring includes a first chamber, the first chamber defining a primary volume, the first chamber including a movable piston, a second chamber fluidicly coupled to the first chamber via a first orifice and a second orifice, the second chamber defining a secondary volume, and an actuator coupled to the movable piston. In some aspects, the first orifice is an electromechanical valve and the second orifice is a bleed valve that equalizes the pressure between the first and second chambers.

12 Claims, 2 Drawing Sheets

(56) References Cited

U.S. PATENT DOCUMENTS

2009/0140501 A1* 6/2009 Taylor .................... B60G 21/06
                                                    280/5.508
2014/0190156 A1* 7/2014 Reybrouck ............ B60G 13/14
                                                    60/431
2017/0211649 A1* 7/2017 Leonard ................. B60G 13/10

* cited by examiner

SELF-BALANCING MULTI-CHAMBER AIR SPRING

INTRODUCTION

The present invention relates generally to the field of vehicles and, more specifically, to a self-balancing multi-chamber air spring for a vehicle suspension system.

Air springs may be used as part of an air suspension system for a vehicle. Air springs can provide adjustable suspension and load support by increasing an amount of air support when the vehicle is more loaded and reducing an amount of air support when the vehicle is less loaded.

However, the isolation of one or more of a number of air chambers while the size of the variable chamber is changing can result in uneven pressures between primary and secondary volumes, resulting in uneven vehicle corner weights.

SUMMARY

Embodiments according to the present disclosure provide a number of advantages. For example, embodiments according to the present disclosure enable connection of one or more fixed-volume chamber(s) with one or more variable-volume chamber(s) by way of a regulated orifice to balance uneven pressure between the primary volume(s) and the one or more secondary volumes, with the transfer of fluid between the primary and secondary volumes occurring at a frequency that is sufficiently low to preserve the dynamic spring rate of a comparable spring having one or more closed secondary volume chambers.

In one aspect, a self-balancing air spring includes a first chamber, the first chamber defining a primary volume, the first chamber including a movable piston, a second chamber fluidicly coupled to the first chamber via a first orifice and a second orifice, the second chamber defining a secondary volume, and an actuator coupled to the movable piston. In some aspects, the first orifice is an electromechanical valve and the second orifice is a bleed valve that equalizes the pressure between the first and second chambers.

In some aspects, the actuator is a spring.

In some aspects, the second orifice allows a flow a fluid such that a frequency of volume transfer between the second chamber and the first chamber is within a predetermined frequency range.

In some aspects, the self-balancing air spring further includes a third chamber, the third chamber defining a third volume, the third chamber fluidicly coupled to the first chamber via a third orifice, and wherein the third orifice is a bleed valve.

In some aspects, the self-balancing air spring further includes a fourth chamber, the fourth chamber defining a fourth volume, the fourth chamber fluidicly coupled to the first chamber via a fourth orifice, and wherein the fourth orifice is a bleed valve.

In some aspects, each of the second, third, and fourth orifices allow a flow of fluid such that a frequency of volume transfer between the second chamber and the first chamber, the third chamber and the first chamber, and the fourth chamber and the first chamber is within a predetermined frequency range.

In some aspects, the actuator is an electromechanical actuator and is controlled to translate the movable piston and change the primary volume of the first chamber based on one or more of a desired vehicle ride height, a desired change in spring rate due to a vehicle weight condition, and a desired air spring stiffness.

In another aspect, a vehicle suspension system includes a self-balancing air spring, the air spring including a first chamber, the first chamber defining a primary volume, the first chamber including a movable piston, a second chamber fluidicly coupled to the first chamber via an electromechanical valve and a first bleed valve, the second chamber defining a secondary volume, and an actuator coupled to the movable piston; and a controller coupled to the electromechanical valve and the actuator. The first bleed valve permits a flow of fluid between the primary volume and the secondary volume such that the first and second chambers are maintained at an equal pressure.

In some aspects, the first bleed valve allows a flow a fluid such that a frequency of volume transfer between the second chamber and the first chamber is within a predetermined frequency range.

In some aspects, the self-balancing air spring further includes a third chamber, the third chamber defining a third volume, and the third chamber is fluidicly coupled to the first chamber via a second bleed valve.

In some aspects, the self-balancing air spring further includes a fourth chamber, the fourth chamber defining a fourth volume, and the fourth chamber is fluidicly coupled to the first chamber via a third bleed valve.

In some aspects, each of the first, second, and third bleed valves allow a flow of fluid such that a frequency of volume transfer between the second chamber and the first chamber, the third chamber and the first chamber, and the fourth chamber and the first chamber is within a predetermined frequency range.

BRIEF DESCRIPTION OF THE DRAWINGS

The present disclosure will be described in conjunction with the following figures, wherein like numerals denote like elements.

Figure 1:
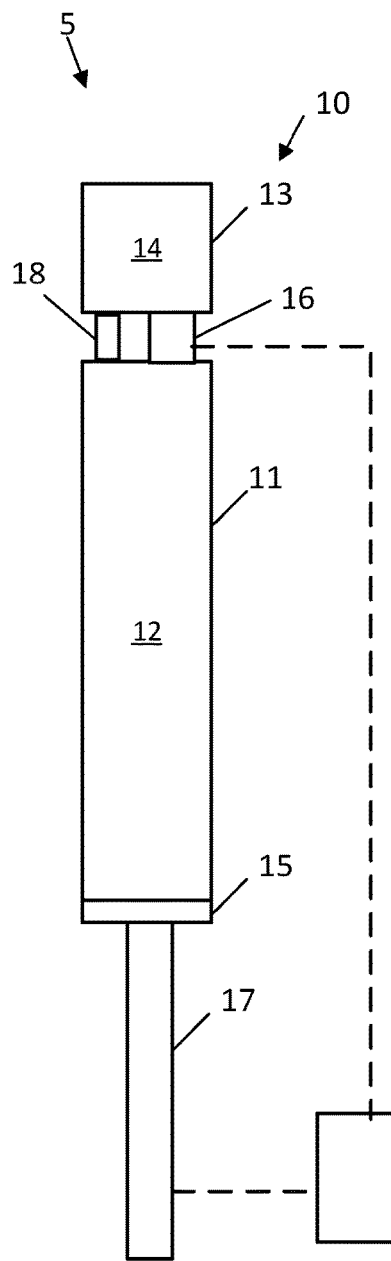
FIG. 1 is a schematic diagram of an air spring in a first configuration, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

In an air spring with multiple chambers where any number of fixed-volume chambers can be isolated from the active, variable-volume chamber, embodiments discussed herein connect one or more fixed-volume chamber(s) with the variable-volume chamber by way of a regulated orifice to balance uneven pressure between a primary volume and the one or more secondary volumes, with the transfer of fluid between the primary and secondary volumes occurring at a frequency that is sufficiently low to preserve the dynamic spring rate of a comparable spring having one or more closed secondary volume chambers.

By the inclusion of a sufficiently small orifice with a frequency of volume transfer sufficiently below the frequencies associated with vehicle suspension motions, all chambers within the spring can be maintained at essentially equivalent pressures.

Air springs can consist of one or more primary volume chambers connected to one or more secondary volume chambers by a regulated orifice. As shown in FIGS. 1-4, a vehicle suspension system 5 includes an air spring 10. The air spring 10 includes a first chamber 11 defining a primary volume 12. A second chamber 13 defines a secondary volume 14. In some embodiments, the primary volume 12 has a changeable volume. In some embodiments, the secondary volume 14 is a fixed volume. A movable piston 15 forms one boundary of the first chamber 11. The piston 15 is actuated on by an actuator 17 such that the piston 15 translates vertically (for the configuration shown in FIGS. 1-4). The primary volume 12 has a changeable volume from V1 to V1' and vice versa depending on the position of the piston 15, as discussed in greater detail herein. In some embodiments, the actuator 17 is a spring. In some embodiments, the actuator may be mechanically or electrically controlled. In some embodiments, the actuator 17 is a spring connected to a suspension system of a vehicle and reacts to changes in position of the vehicle suspension due to travel over rough road surfaces, vehicle weight changes, vehicle turns, etc., for example and without limitation.

In some embodiments, the vehicle suspension system includes a controller 22. In some embodiments, the actuator 17 is electronically connected, via a wired or wireless connection, to the controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

In some embodiments, the actuator 17 is an electromechanical actuator and the controller 22 generates one or more control signals to control the actuator 17 to translate the piston 15 and change the volume of the first chamber 11 based on factors such as, for example and without limitation, a desired vehicle ride height, a desired change in spring rate due to a vehicle weight condition, road conditions, etc. In some embodiments, the actuator 17 reacts to changes in the vehicle suspension to modify a stiffness of the air spring and adjust the vehicle ride quality.

The primary and secondary volumes 12, 14 are fluidicly connected via an orifice. In some embodiments, passage of fluid through the orifice is controlled by a valve 16. In some embodiments, the valve 16 is an electromechanical valve. With reference to FIG. 1, the valve 16 is electronically connected, via a wired or wireless connection, to the controller 22. In some embodiments, the controller 22 generates a control signal to control the valve 16 to open or close and change the pressures in each of the first and second chambers 11, 13 based on factors such as, for example and without limitation, a desired change in spring rate due to a vehicle weight condition, road conditions, etc.

The primary and secondary volumes 12, 14 are also fluidicly connected via an auxiliary orifice 18. In some embodiments, the auxiliary orifice 18 is a passive bleed valve.

FIGS. 1-4 illustrate a progression of changes in volume of the primary volume 12 and changes in pressures of each of the first and second chambers 11, 13 due to movement of the piston 15 and/or actuation of the valve 16. As shown in FIG. 1, the valve 16 is open such that the pressure P is the same in both of the first and second chambers 11, 13 and the air spring 10 is set to a first spring rate.

Figure 2:
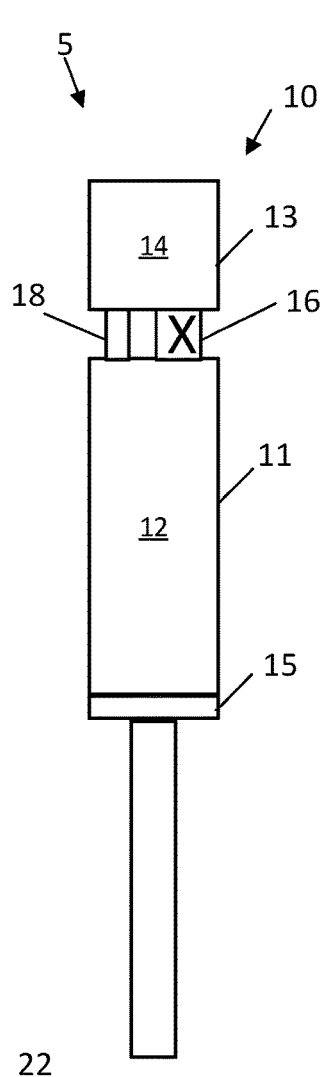
FIG. 2 is a schematic diagram of the air spring of FIG. 1 in a second configuration, according to an embodiment.

With reference now to FIG. 2, the piston 15 is acted on by the actuator 17 such that the piston 15 moves vertically upward to reduce the size of the first chamber 11 and correspondingly reduce the volume of the primary volume 12, from V1 to V1'. Translation of the piston 15 vertically upward is, in some embodiments, due to compression of a spring. In some embodiments, translation of the piston 15 vertically upwards is due to actuation of the actuator 17 via a control signal received from the controller 22. Additionally, vertical translation of the piston 15 increases the pressure in both of the first and second chambers 11, 13 to a second pressure P2 that is greater than the pressure P. Initially, the valve 16 is open such that the pressure P2 is equal between the first and second chambers 11, 13.

Figure 3:
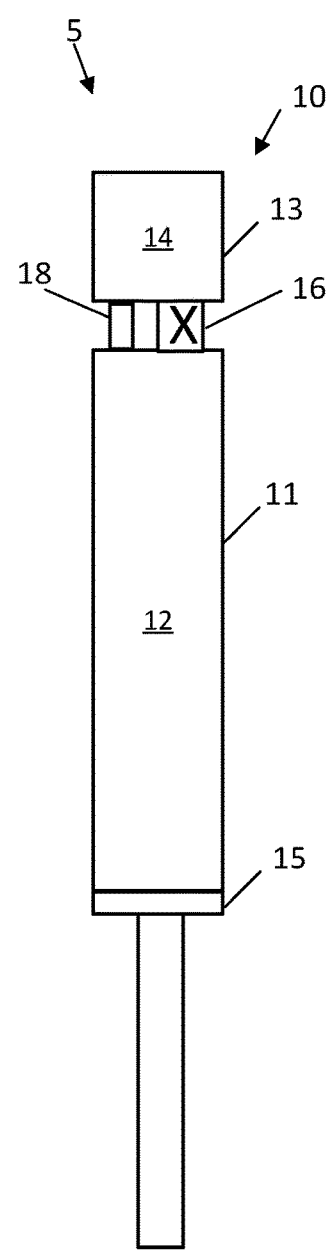
FIG. 3 is a schematic diagram of the air spring of FIG. 1 in a third configuration, according to an embodiment.

With continued reference to FIG. 2, when the valve 16 is closed, the pressure contained within the second chamber 13 is retained at the higher pressure P2. Referring now to FIG. 3, as the piston 15 translates vertically downward due to action of the actuator 17 such as, for example, decompression of a spring or actuation of the actuator 17 due to a control signal received from the controller 22, the primary volume 12 defined by the first chamber 11 increases from V2' to V2. Correspondingly, the pressure contained within the primary volume 12 decreases from P2 to some pressure lower than P2. Due to the closure of the valve 16, the pressure between the first and second chambers 11, 13 is different and the pressure contained within the first chamber 11 is lower than the pressure contained within the second chamber 13. This reduction in pressure may lead to a lower than desired pressure in the first chamber 11.

Figures 4, 5:
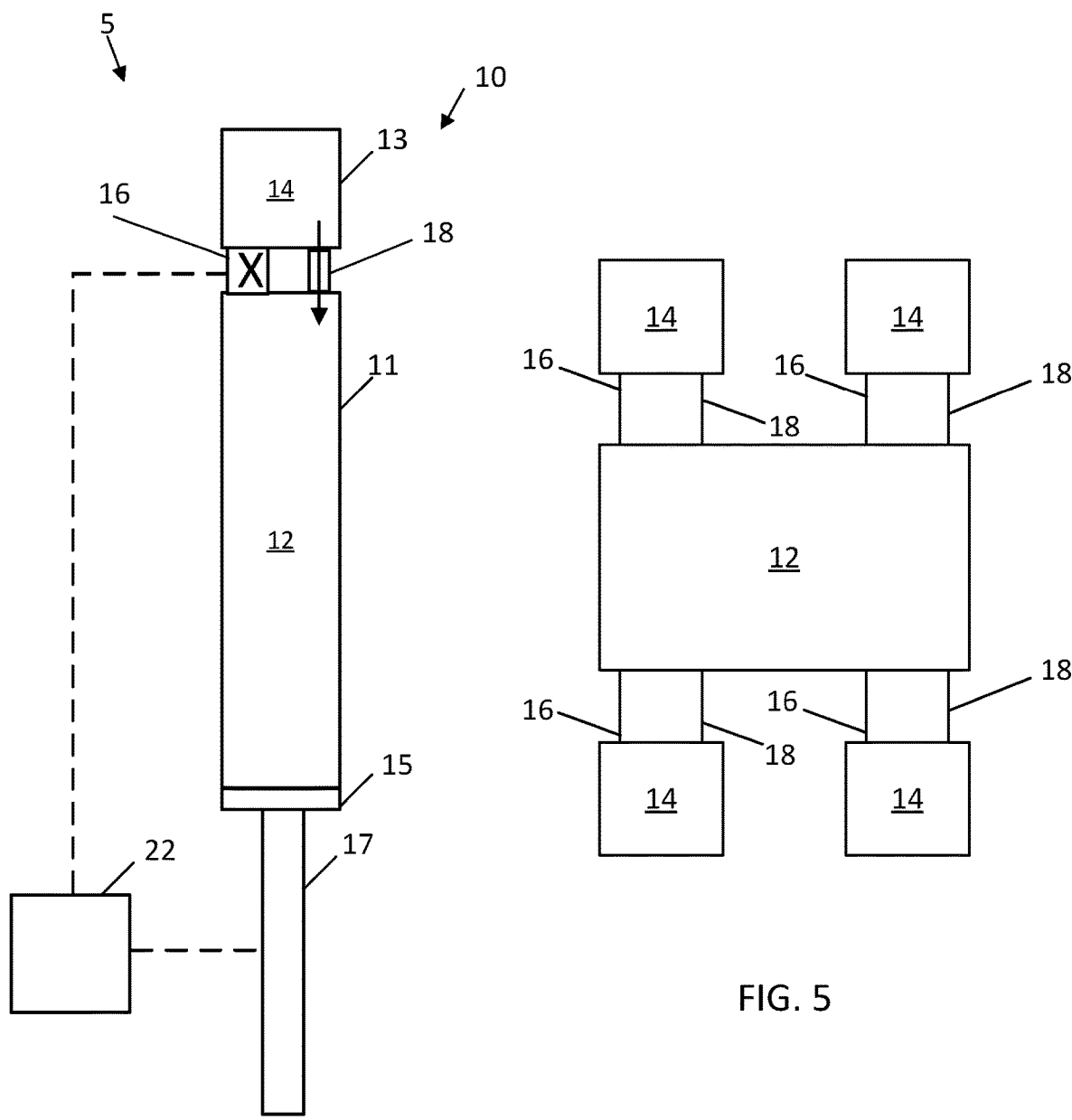
FIG. 4 is a schematic diagram of the air spring of FIG. 1 in a fourth configuration, according to an embodiment.
FIG. 5 is a schematic diagram of an air spring having a plurality of secondary volumes fluidicly coupled to a primary volume, according to an embodiment.

FIG. 4 illustrates the use of the auxiliary orifice 18 to equalize the pressure between the first and second chambers 11, 13. When the pressure in the second chamber 13 exceeds the pressure in the first chamber 11, and the valve 16 is closed, the auxiliary orifice 18 allows the passage of fluid from the second chamber 13 to the first chamber 11. This equalization of pressure without activation of the valve 16 prevents a change in vehicle trim height and eliminates noise associated with the release of a volume of air at a different pressure from the first chamber. The pressure equalization also allows for adjustment to the spring rate of the air spring 10 while the vehicle suspension is at a position other than a predetermined ride height without affecting the vehicle or the vehicle ride height. Furthermore, the auxiliary orifice 18 creates a secondary release path for fluid pressure in the second chamber 13 other than the primary release path via a position of the valve 16.

With continued reference to FIG. 4, uneven pressures between the first and second chambers 11, 13 are equalized by allowing flow through the auxiliary orifice 18 at such a rate that the primary modal frequency associated with the vehicle suspension motion will remain at or below a predetermined frequency limit that is based only upon the variable volume in the first chamber 11. The auxiliary orifice 18 has an area of flow that is calculated to have a flow rate that produces a modal frequency in a predetermined frequency range. The calculated flow rate generates a modal frequency that is less than a modal frequency for an air spring without an auxiliary orifice but the calculated flow rate is greater than a flow rate that would produce frequencies resulting in persistent effects that could limit the handling performance of the vehicle. In some embodiments, the calculated flow rate is tunable based on vehicle configuration, air spring configuration, and desired suspension characteristics, among other factors. The auxiliary orifice 18 is used to minimize the need for the valve 16 to be closed with precise timing during high velocity translation of the actuator 17. In some embodiments, the auxiliary orifice 18 also eliminates the need for the valve 16 to be re-opened to compensate for the uneven pressures between the first and second chambers 11, 13 while maintaining the smaller variable volume spring 11 is desired.

While FIGS. 1-4 illustrate a single primary volume fluidicly coupled with a single secondary volume, in other embodiments, multiple, fixed-volume secondary volumes are fluidically coupled with a single primary volume. A separate auxiliary orifice 18 connects each of the secondary volumes to the primary volume. In some embodiments, each of the auxiliary orifices 18 is separately tuned to control the flow through the orifice to adjust the spring stiffness and modal frequency of the vehicle suspension. In some embodiments, all or any subset of the auxiliary orifices 18 are opened to allow air to pass between the secondary volume and the primary volume. In some embodiments, two (2), three (3), four (4), or more secondary volumes are fluidicly coupled to the primary volume via second, third, and fourth orifices, each of which may be bleed valves.

FIG. 5 schematically illustrates a plurality of secondary volumes 14 fluidically coupled to the primary volume 12. Similar to the embodiment shown in FIGS. 1-4, each of the secondary volumes 14 is fluidically coupled to a single primary volume 12 via a valve 16, which is, in some embodiments, an electromechanical valve. While not shown in FIG. 5, similar to FIG. 1, the valves 16 are electronically connected, via a wired or wireless connection, by the controller 22. Each of the secondary volumes 14 is also fluidically coupled to the single primary volume 12 via an auxiliary orifice 18. As in the embodiment shown in FIGS. 1-4, each of the auxiliary orifices is tuned to control the flow from the secondary volume to the primary volume such that the frequency of volume transfer between each of the secondary volumes to the primary volume is below a predetermined frequency limit.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A self-balancing air spring, comprising:
   a first chamber, the first chamber defining a variable, primary volume, the first chamber comprising a moveable piston;
   a second chamber fluidically coupled to the first chamber via a first orifice and a second orifice, the second chamber defining a fixed, secondary volume; and
   an actuator coupled to the moveable piston;
   wherein the first orifice is an electromechanical valve and the second orifice is a bleed valve that equalizes the pressure between the first and second chambers and the first orifice and the second orifice are arranged in parallel and each of the first orifice and the second orifice directly connects the variable, primary volume to the fixed, secondary volume.

2. The self-balancing air spring of claim 1, wherein the actuator is a spring.

3. The self-balancing air spring of claim 1, wherein the second orifice allows a flow a fluid such that a frequency of volume transfer between the second chamber and the first chamber is within a predetermined frequency range.

4. The self-balancing air spring of claim 1, further comprising a third chamber, the third chamber defining a third volume, the third chamber fluidically coupled to the first chamber via a third orifice, and wherein the third orifice is a bleed valve.

5. The self-balancing air spring of claim 4, further comprising a fourth chamber, the fourth chamber defining a fourth volume, the fourth chamber fluidically coupled to the first chamber via a fourth orifice, and wherein the fourth orifice is a bleed valve.

6. The self-balancing air spring of claim 5, wherein each of the second, third, and fourth orifices allow a flow of fluid such that a frequency of volume transfer between the second chamber and the first chamber, the third chamber and the first chamber, and the fourth chamber and the first chamber is within a predetermined frequency range.

7. The self-balancing air spring of claim 1, wherein the actuator is an electromechanical actuator and is controlled to translate the moveable piston and change the primary volume of the first chamber based on one or more of a desired vehicle ride height, a desired change in spring rate due to a vehicle weight condition, and a desired air spring stiffness.

8. A vehicle suspension system, comprising:
   a self-balancing air spring, the air spring comprising a first chamber, the first chamber defining a variable, primary volume, the first chamber comprising a moveable piston, a second chamber fluidically coupled to the first chamber via an electromechanical valve and a first bleed valve arranged in parallel, the second chamber defining a fixed, secondary volume, and an actuator coupled to the moveable piston; and
   a controller coupled to the electromechanical valve and the actuator;
   wherein the first bleed valve permits a flow of fluid between the primary volume and the secondary volume such that the first and second chambers are maintained at an equal pressure.

9. The vehicle suspension system of claim 8, wherein the first bleed valve allows a flow a fluid such that a frequency of volume transfer between the second chamber and the first chamber is within a predetermined frequency range.

10. The vehicle suspension system of claim 8, wherein the self-balancing air spring further comprises a third chamber, the third chamber defining a third volume, and the third chamber is fluidicly coupled to the first chamber via a second bleed valve.

11. The vehicle suspension system of claim 10, wherein the self-balancing air spring further comprises a fourth chamber, the fourth chamber defining a fourth volume, and the fourth chamber is fluidicly coupled to the first chamber via a third bleed valve.

12. The vehicle suspension system of claim 11, wherein each of the first, second, and third bleed valves allow a flow of fluid such that a frequency of volume transfer between the second chamber and the first chamber, the third chamber and the first chamber, and the fourth chamber and the first chamber is within a predetermined frequency range.

* * * * *